Dec. 28, 1937. J. TOMEC Re. 20,607

BUILDING MATERIAL

Original Filed Aug. 3, 1935 2 Sheets-Sheet 1

Inventor
John Tomec

Albert Sperry,
Atty

Dec. 28, 1937. J. TOMEC Re. 20,607

BUILDING MATERIAL

Original Filed Aug. 3, 1935 2 Sheets-Sheet 2

INVENTOR.
John Tomec.
BY
Albert Sperry.
ATTORNEY.

Reissued Dec. 28, 1937

Re. 20,607

UNITED STATES PATENT OFFICE 20,607

BUILDING MATERIAL

John Tomec, Trenton, N. J.

Original No. 2,075,373, dated March 30, 1937, Serial No. 34,510, August 3, 1935. Application for reissue June 25, 1937, Serial No. 150,342

11 Claims. (Cl. 154—45.9)

My invention relates to building materials and particularly to constructions adapted to be embodied in products such as shingles, sidings, and the like for use on the exterior of a building or in wallboards, panels or the like for use on the interior of a building. My invention is also adapted for use as a base to which stucco, plaster, cement or composition materials may be applied in the construction of walls, ceilings, roofs or floors which are built up in place.

Building materials such as wall boards, shingles and sidings as well as built up roofs and flooring have been produced heretofore in which there is a base member or backing to which one or more layers of material such as cement, asphalt or stucco are applied. The exposed surfaces of such products in some instances are formed with or given a design or appearance to simulate brick, stone, tile, or other conventional building materials.

While such products are made in a great variety of forms and from many different materials there is a tendency for the products to warp or for one or more layers to crack, peel off, or buckle due to unequal expansion and contraction of the layers of material. When the products are secured in place differences in expansion and contraction of the products themselves and the structure to which they are applied frequently cause strains in the material which result in cracking, warping, buckling or peeling of the product. Furthermore such products are relatively expensive and any thickening of one or more layers to reduce warping and cracking serves to increase the weight, bulk and cost of the product still further and does not always overcome the difficulties inherent in such constructions.

In accordance with my invention these difficulties and disadvantages in prior constructions are overcome and a light, durable and inexpensive product is produced. The products preferably comprise a plurality of layers which are capable of limited movement with respect to a base or backing or with respect to the structure to which they are applied. Further, my invention embodies novel methods and means for securing the surface or wear receiving layer to a backing or structure by which it is carried.

One of the objects of my invention is to provide a novel type of building material which is light, durable and inexpensive.

Another object of my invention is to provide building material formed of a plurality of layers which are capable of limited movement with respect to a base or supporting structure.

A further object of my invention is to provide a building unit embodying means serving to take up differences in expansion and contraction of portions of the unit.

Another object of my invention is to provide a novel form of retaining means by which cement, plaster, stucco, asphalt or other materials may be secured to a backing or support.

Still another object of my invention is to reduce or eliminate warping, cracking and buckling of building units and the like.

These and other objects and features of my invention will appear from the following description thereof in which reference is made to the accompanying figures of the drawings wherein illustrative embodiments of my invention are shown.

Figure 1:
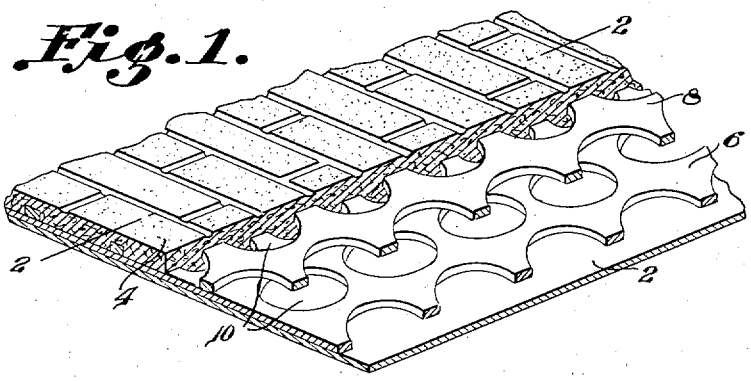
Fig. 1 is a perspective of a building unit embodying my invention with parts thereof broken away.
Figure 2:
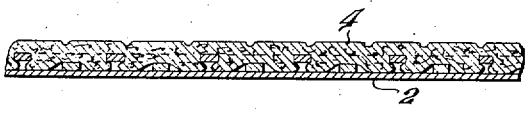
Fig. 2 is a vertical sectional view of the construction illustrated in Fig. 1 taken on the line 2—2.

In that form of my invention chosen for purposes of illustration in Figs. 1 and 2 of the drawings my invention is shown as embodied in a unit such as siding material or the like to be applied to the exterior of a building. The unit comprises a base member or backing 2 which may be formed of any suitable material such as a preformed sheet of paper, cardboard, plaster board, fiber board, cement-asbestos material, gypsum board or the like. The base may be of any desired weight or thickness and may be formed to give the product heat or sound insulating properties or to provide or improve the fire and water resistance properties of the product. The size and shape of the base member may also be varied to adapt the same for any desired use and will depend in part upon the purpose for which the article is to be employed. In forming a rigid product the backing may be relatively thick and strong whereas light and flexible products may be produced by the use of light paper, cardboard or asbestos paper as the backing material.

The base member 2 is provided with retaining means to which the surface or wear receiving layer 4 is applied. The retaining means which constitutes an intermediate layer in the construction illustrated in Fig. 1 is formed of a lower sheet 6 and an upper sheet 8. These sheets have apertures or perforations 10 therein arranged so that the edges of the perforations in the upper sheet 8 overlap or extend beyond the edges of the perforations of the lower sheet 6. The overhanging edges thus provided permit the material of the surface layer to flow or expand into the apertures 10 in the lower sheet and behind the edges of the apertures in the upper sheet so as to hold the surface layer firmly thereto. The layers 6 and 8 may be secured together in any suitable way by the use of adhesive, staples, felting or setting of the sheets or layers or otherwise as desired. The second layer made up of the sheets 6 and 8 is secured in turn to the backing 2 in the same or any other suitable manner to provide a unitary product. Preferably the retaining means or adjacent layers of the product are of a yielding or compressible nature and yet sufficiently strong to provide adequate support for the surface layer. Typical of such materials are cardboard, pulp board, fiber board, wire mesh or expanded metal constructions and the like.

The surface layer 4 may be formed of a plastic or other composition the nature of which will depend largely upon the character of the product to be produced. When forming a rigid sheet or unit the layer 4 may be formed of cement, plaster, stucco or other setting material applied in a plastic condition so that it will flow into and through the openings 10 in the upper sheet 8 and into the rear of the edges of the openings so as to provide an expanded or overhanging retaining portion extending beneath the upper sheet of the retaining means.

Products embodying my invention may be formed as flexible or semi-rigid sheets or units comparable with asphalt saturated felt products by the use of a suitable surface layer which may be formed of a composition such as linoleum, bitumen, pitch or asphalt and may have granulated slate or the like embedded or incorporated therein. The exposed surface of either flexible or rigid constructions may be embossed or otherwise formed to give the desired appearance and may be made to simulate brick, stone, shingles or the like as needed or preferred. The embossing operation also serves to force the material of the surface layer through the perforations in the sheet 8 and into contact with the base member especially when the location of the depressed areas and perforations coincide.

Figure 3:
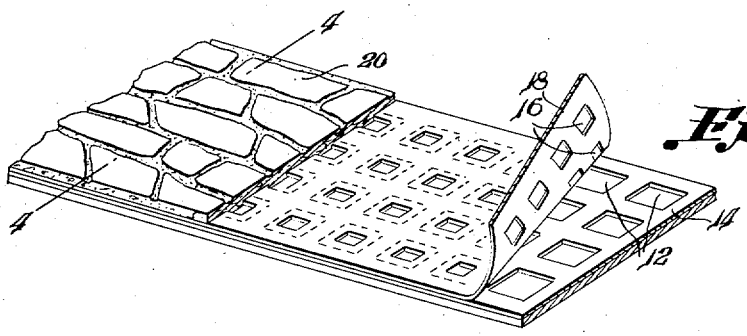
Fig. 3 is a perspective of an alternative form of retaining means that may be used in the construction of products embodying my invention.
Figure 4:
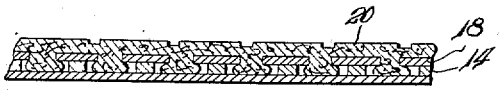
Fig. 4 is a sectional view of the construction of Fig. 3 taken on the line 4—4.

As shown in Figs. 3 and 4 the retaining means may be formed by providing relatively large apertures or openings 12 in the lower sheet 14 and smaller openings 16 in the upper sheet 18. Each of the openings 16 thus overhangs the edges of the corresponding openings 12 in the lower sheet on all sides thereof. The openings 16 are therefore unobstructed and permit the passage of material through the same and into the rear of the upper sheet even when the surface layer 20 is formed of a relatively stiff composition.

Figure 5:
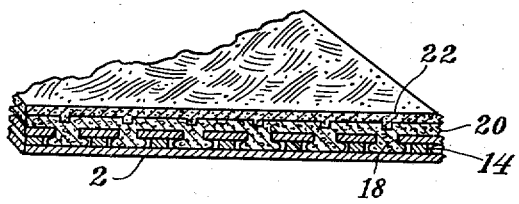
Fig. 5 is a perspective of a further alternative form of product embodying my invention with parts broken away.

In the embodiment of my invention illustrated in Fig. 5 the product serves as a base for plaster or stucco for either interior or exterior use. The product comprises a construction similar to that of Figs. 3 and 4 wherein the surface layer 20 is formed of a cement and sand mix or of any other suitable composition and cross hatched, embossed or roughened to receive plaster or stucco. Units made up in this manner can be readily and quickly secured in place on the walls of a room or building. Thereafter it is only necessary to moisten the surface and apply a relatively thin layer of stucco or plaster 22 to provide a finished surface.

If the roughened layer 20 of the product is formed to simulate a matte brick or stone construction it may be used directly without the finish layer 22 so that the same unit can be used throughout the building both inside and out and the desired finish applied as desired to any surface or portion to give an attractive and suitable appearance.

Figure 6:
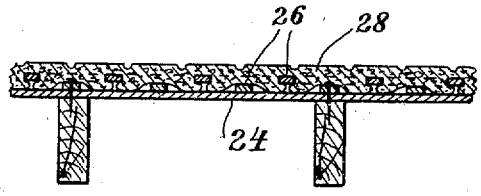
Fig. 6 is a sectional view of my invention as used in forming a built up structure such as a wall or roof.

In Fig. 6 of the drawings, I have illustrated a construction adapted for use in forming a built up floor, wall or roof. The base layer 24 may be wooden sheeting, tar paper, building paper or the like whereas the retaining means 26 may be any of those shown or described in connection with Figs. 1, 2 or 4 or of any other suitable or preferred construction. The surface layer 28 may be a suitable bituminous cement or concrete mixture, a linoleum composition or other material adapted for use on floors, walls or roofs to give the necessary or desired wearing characteristics and appearance.

Figure 7:
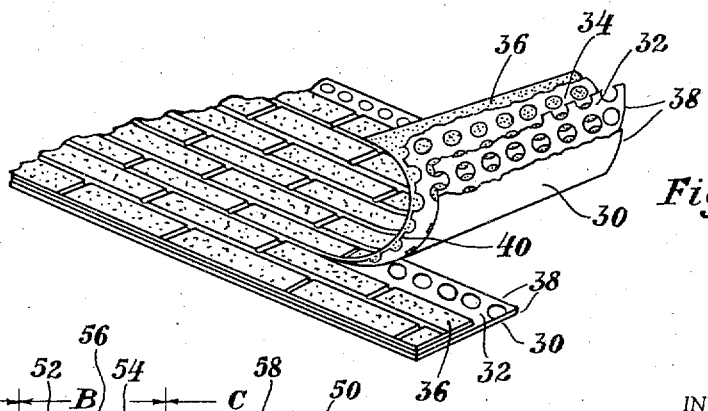
Fig. 7 is a perspective of a flexible construction embodying my invention with parts broken away.

The construction of Fig. 7 is designed for use as siding, roofing and the like and embodies a backing 30 of light paper, saturated felt or the like. The retaining means comprises two layers 32 and 34 whereas the surface layer is made up of the composition 36 having granular material embedded therein. As shown the edges of the material may be formed to provide a suitable over lap by constructing the edges 38 of the backing 30 and the lower layer 32 of the retaining means so that they project beyond the adjacent edge of the upper layer 34 of the retaining means and the surface layer 36.

The opposite edges 40 of the upper layer 34 of the retaining means and the surface layer 36 extend beyond the adjacent edges of the lower layer 32 and the backing 30. The units may thus be laid with the edges overlapping and secured by pitch or cement or by pressing the parts together so as to cause the upper and lower layers of the retaining means to be firmly bonded together.

In each of the forms of my invention described it will be noted that the material or composition of the surface layer is not bonded directly to the base member or backing so that limited relative movement of the surface layer and of the backing can take place and any strains which would otherwise cause warping, cracking or buckling of the products are taken up by the retaining means and are not transmitted to the other elements of the construction. Thus for example it is possible to produce light and inexpensive products with a suitable thin sheet of material as a backing and to use cardboard or expanded metal as the retaining means, securing the retaining means to the base by staples, adhesive or cement. A suitable surface layer of an entirely different character from the base can then be applied to the retaining means, and any expansion or contraction thereof will be relieved by compression or flexing of the relatively light and flexible retaining means. In this way a durable product is provided and warping or cracking thereof is reduced or eliminated altogether. The difficulties inherent in heavier, and more expensive products are thereby overcome and a very inexpensive, light weight product produced.

Figure 8:
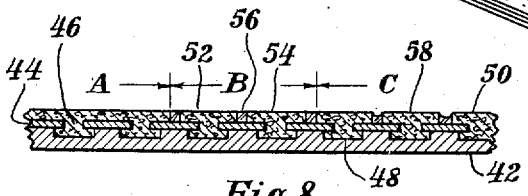
Fig. 8 is a vertical sectional view of a further alternative construction embodying my invention.

In the form of my invention shown in Fig. 8 of the drawings, the construction is simplified by forming the base 42 of the material with a corrugated or indented surface and using only a sheet 44 of perforated material with the opening 46 therein located above the indentations or corrugations 48 in the base. In this way a space is provided beneath the edges of the openings 46 into which material of the surface layer 50 may extend. The base may be formed of plaster board or the like or may be made of saturated felt to provide either a flexible or rigid product. It should however, have sufficient body to insure the presence of spaces beneath the edges of the openings 46 during formation of the sheet or until the surface layer has been applied thereto.

The size of the base may be varied as desired and can conveniently be made in sizes to be applied either to the floor of a room or to be used as shingles upon a roof. The sheet 44 may be made of very thin sheet metal to give strength and fire resistant properties to the product. At the same time the product may be flexible due to the flexibility of the sheet material. If preferred the sheet may be made of paper, cardboard, or other material as desired and the surface layer may be made of a plastic setting material to produce a rigid product or of a flexible material such as asphalt, rubber or other suitable material with or without slate or granular material thereon.

As shown in Fig. 8, the surface layer may be continuous as shown in the portion A and may be plaster, stucco or other material. The surface layer may in the alternative be formed as in the portion B of Fig. 8 to give a stone or tile effect wherein the parts 52 and 54 of the surface layer are of different color or composition and an intervening portion 56 is provided which may be flush with the surface of the parts 52 and 54 but of a different color or appearance to simulate mortar or cement. Further the portions of the surface layer may be embossed or otherwise formed as shown at 58 in the portion C of Fig. 8 to give other decorative effects as desired.

This type of product is not only relatively inexpensive to produce but can be made very rapidly and easily to provide a wide range of attractive and useful products.

While I have illustrated and described certain typical embodiments of my invention as applied to building units and built up constructions it should be clearly understood that my invention is capable of use in a great variety of forms and may embody any of a great variety of materials. For this reason I do not wish my invention to be interpreted as limited to those forms thereof specifically referred to herein except as defined by the claims.

I claim:

1. Building material embodying two sheets each formed with openings therein, the openings in one sheet having the edges thereof overlapping the edges of the openings in the other sheet and a plastic layer of wear receiving material applied to and covering the surface of one sheet only and extending through the openings in said sheet and into the openings in the other sheet.

2. Building material comprising a backing, two layers of material carried by said backing and each formed with openings therethrough, the openings in one sheet having the edges thereof overlapping the edges of the openings in the other sheet and material applied to one of said sheets extending through the openings therein and into the openings in the other sheet and confined therein by said backing.

3. Building material having embodied therein two sheets of material each of which has openings formed therein, said sheets being positioned with the edges of the openings in one sheet overlapping the edges of the openings in the other sheet and material applied to one of said sheets extending through the openings therein and into openings in the other sheet and extending behind an edge of the openings in the first sheet and a sheet of backing material enclosing the openings in said second sheet and covering material extending into the openings therein.

4. Building material in the form of a flat sheet adapted to be used as wall board or siding material having embodied therein two sheets of material each of which has openings formed therein, said sheets being positioned with the edges of the openings in one sheet overlapping the edges of the openings in the adjacent sheet and plastic material applied to one sheet extending through the openings therein and into the openings in the adjacent sheet and expanded into interlocking relation with the edges of the openings in the first sheet and a sheet of backing material secured to said other sheet and enclosing the openings therein.

5. Building material comprising a thin layer of backing material having two sheets of material carried by said backing and each formed with openings therethrough, the openings in one sheet having the edges thereof overlapping the edges of the openings in the other sheet and a wear resisting layer carried by one of said sheets and extending into said openings.

6. Building material comprising a backing formed of paper, two sheets of material substantially heavier than said backing to which said backing is secured, each of which sheets has openings formed therein, said sheets being positioned with the edges of the openings in one sheet overlapping the edges of the openings in the other sheet and plastic material applied to one sheet extending through the openings therein and into the openings in the adjacent sheet and expanded into interlocking relation with the edges of the openings in the first sheet.

7. A structural unit comprising two apertured layers of material, the openings in said layers being in communication and those of one layer being smaller than those in the other, material applied to that layer having the smaller openings extending therethrough into the openings in the other layer.

8. Building material comprising a sheet formed with openings therein and an overlying member having smaller openings therein communicating with the openings in said sheet and a plastic layer of wear receiving material applied to one sheet extending through the openings in said sheet and into the openings in the other sheet.

9. A rigid building unit comprising a backing, two layers each formed with openings therein, the openings in one sheet having the edges thereof overlapping the edges of the openings in the other sheet and a layer of cementitious material applied to one layer and extending into the openings in the other.

10. A building unit comprising a base member, a sheet of material overlying said base member and formed with openings therein, means on said base member providing spaces beneath said openings extending beyond the edges thereof and a layer of plastic material applied to said sheet extending through said openings into said spaces and behind the edges of said openings.

11. A building unit comprising a base member having a surface thereof formed with depressions therein, a sheet of material secured to said surface and formed with openings therein, the edges of which overlie said depressions and a surface layer applied to said sheet extending through the openings therein into said depressions and beneath the edges of said openings.

JOHN TOMEC.